United States Patent [19]

Cupolo, III

[11] Patent Number: 5,666,174
[45] Date of Patent: Sep. 9, 1997

[54] EMISSIVE LIQUID CRYSTAL DISPLAY WITH LIQUID CRYSTAL BETWEEN RADIATION SOURCE AND PHOSPHOR LAYER

[76] Inventor: Anthony M. Cupolo, III, 3425 Woodrun Trail, Marietta, Ga. 30062

[21] Appl. No.: 602,048

[22] Filed: Feb. 15, 1996

Related U.S. Application Data

[60] Provisional application No. 60/002,208, Aug. 11, 1995.
[51] Int. Cl.$^6$ .................. G02F 1/1335; G02F 1/1333
[52] U.S. Cl. .................. 349/64; 349/71; 349/110
[58] Field of Search .................. 359/49, 67, 50; 349/64, 71, 110

[56] References Cited

U.S. PATENT DOCUMENTS

| | | | |
|---|---|---|---|
| 4,799,050 | 1/1989 | Prince et al. | 359/50 |
| 4,822,144 | 4/1989 | Vriens | 349/71 |
| 4,881,797 | 11/1989 | Aoki et al. | 359/68 |
| 5,146,355 | 9/1992 | Prince et al. | 359/50 |
| 5,305,154 | 4/1994 | Sumi et al. | 359/67 |
| 5,434,688 | 7/1995 | Saitoh et al. | 349/110 |
| 5,504,597 | 4/1996 | Sprague et al. | 359/69 |
| 5,510,916 | 4/1996 | Takahashi | 349/110 |

FOREIGN PATENT DOCUMENTS

| | | | |
|---|---|---|---|
| 62-194279 | 8/1987 | Japan | 359/50 |
| 62-194280 | 8/1987 | Japan | 359/50 |
| 2-077725 | 3/1990 | Japan | 359/49 |
| 6-222360 | 8/1994 | Japan | 359/50 |

OTHER PUBLICATIONS

Walsh and Wyler, "Improved lighting efficiency for active matrix liquid crystals displays," *SPIE* vol. 2219 *Cockpit Displays* 299–310 (1994).

*Primary Examiner*—Anita Pellman Gross
*Attorney, Agent, or Firm*—Geoff L. Sutcliffe; Kilpatrick Stockton LLP

[57] ABSTRACT

An emissive liquid crystal display has a backlight and a liquid crystal cell for modulating the light. A phosphor layer receives the modulated light and converts the light into visible light. The phosphor layer may contain just red and green phosphors, with blue light being produced by the backlight, or may contain red, green, and blue phosphors based on near-ultraviolet light produced by the backlight. The use of the phosphor layer eliminates the need for a color filter within the liquid crystal cell and provides a greater transmittance efficiency. The liquid crystal display also provides an optimal viewing angle, correct chromacity for television, an increased contrast ratio, and a reduction in smear and flicker for a passive-matrix display. The liquid crystal display enables the use of redundant transistors in active-matrix displays and eliminates the need for retardation films or multiple domain architectures and, as a result, presents a lower manufacturing cost for the display.

23 Claims, 4 Drawing Sheets

EMISSIVE LIQUID CRYSTAL DISPLAY WITH LIQUID CRYSTAL BETWEEN RADIATION SOURCE AND PHOSPHOR LAYER

This application is a continuation of provisional application Ser. No. 60/002,208, filed on Aug. 11, 1995.

FIELD OF THE INVENTION

This invention generally relates to a display and, more particularly, to an emissive flat panel liquid crystal display.

BACKGROUND OF THE INVENTION

A cathode ray tube (CRT) has been a dominant display technology since the introduction of television. In operation, the CRT relies upon cathodoluminescence to emit light which forms the desired pictures. More precisely, an emissive material, commonly phosphor, is bombarded with a beam of high energy electrons to cause the phosphor to emit light to form a desired image. The intensity of the emitted visible light coming from the excited phosphor is uniform in all directions which provides the CRT with excellent viewing angles. In other words, one need not be located directly in front of the CRT in order to view the images on the CRT screen. The ubiquitous CRT is more than adequate in terms of resolution, cost, and brightness for screen diagonal lengths ranging from 5 inches to about 45 inches. Below and above these lengths, however, the depth, weight, and power consumption of the CRT become prohibitive for most display applications.

Another display technology, namely the flat panel display, has steadily improved in resolution, cost, and brightness over recent years. The flat panel display is thin, light weight, and, in general, does not require as much power during normal operation as the CRT. In fact, the flat panel display is increasingly displacing the CRT in a broad range of display applications.

One of the leading technologies for the flat panel display is the liquid crystal display. With reference to FIG. 1, a common liquid crystal display 10 has two white-light fluorescent tubes 1 located at the top and bottom of the display 10. The white light emitted by the fluorescent tubes 1 is directed through a light pipe 2 which guides the white light from the top to the bottom of the display 10 while allowing some of the light to escape in the direction of a diffuser 3. The diffuser 3 uniformly distributes the white light so as to minimize variations in brightness across the surface of the display 10.

The diffused white light is polarized by a rear polarizer 5 which ensures that the white light has a preferred direction of polarization. The rear polarizer 5 is adhered to a rigid, or at least semi-rigid, transparent substrate 7 which is usually made of soda-lime or borosilicate glass, but may be made from other materials, such as quartz or plastic. An optically transparent and electrically conductive electrode pattern 9 is deposited and patterned on the transparent substrate 7 to form the row electrodes of a passive-matrix.

A first alignment layer 11 is deposited on the electrode pattern 9 and has grooves formed in a first direction by a rubbing treatment. A nematic liquid crystal layer 13 is located between the first alignment layer 11 and a second alignment layer 15. The nematic liquid crystal 13 forms a director by aligning with the grooves created in the first and second alignment layers 11 and 15. Alignment layer 15 has grooves formed perpendicular to the grooves in the first alignment layer 11 whereby the director for the nematic liquid crystal 13 twists 90 degrees. Some liquid crystal displays have directors with as much as 270 degrees of twist from alignment layer 11. The alignment layers 11 and 15 are generally composed of a polyamide or silicon dioxide.

The alignment layer 15 is deposited on top of a second electrode pattern 17 which forms the column electrodes of a passive-matrix. The electrode pattern 17, as well as electrode pattern 9, is comprised of an optically transparent and electrically conductive material, such as indium tin oxide (ITO). A passivation layer is preferably provided between the electrode pattern 9 and alignment layer 11 and also between the electrode pattern 17 and alignment layer 15. The passivation layers insulate the electrode patterns 9 and 17 from each other and are commonly comprised of silicon monoxide or silicon dioxide.

The liquid crystal display 10 is a color display and accordingly has a color filter mosaic pattern 19, upon which the electrode pattern 17 is deposited. The color filter mosaic pattern 19 has three color filter materials, an opaque material, and an optional planarizing and transparent acrylic topcoat. The color filters, typically made from molecular dyes or pigments, transmit only one of the primary colors, namely red, green or blue. The color filters absorb all other regions of the visible spectrum present in the white light emitted by the fluorescent tubes 1 and are patterned such that each pixel is completely covered by the color filters. The opaque material surrounds the individual color filter dots and forms a black matrix around them which improves contrast. A transparent topcoat, typically made from an acrylic material, may be deposited on top of the color filter mosaic pattern 19 to form a planar surface which improves deposition of the electrode pattern 17.

The color filter mosaic pattern 19, the electrode pattern 17, and the alignment layer 15 are sequentially deposited on top of a front transparent substrate 21. The front transparent substrate 21, as with the transparent substrate 7, may be rigid or at least semi-rigid, is typically comprised of soda-lime float glass, but may be formed from glass, plastic, or quartz.

A front polarizer 23, commonly referred to as an analyzer, is adhered to the front transparent substrate 21. The analyzer 23 absorbs a certain amount of light coming out of the liquid crystal cell 27, which includes all elements from the rear polarizer 5 to the analyzer 23. More specifically, the analyzer 23 absorbs an amount of light which is proportional to the degree of shift in the light's direction of polarization from the rear polarizer 5. The shift in the direction of polarization is caused by electric and magnetic fields which are produced by voltages applied to the electrode patterns 9 and 17 and which change the orientation of the director formed in the nematic liquid crystal layer 13. Finally, optional anti-reflection treatments 25, in the form of multi-layer optical thin film stacks, may be applied to analyzer 23 to reduce the intensity of specular reflections from ambient light.

A problem with liquid crystal displays in general, however, is that the displays do not efficiently transmit light. Each of the layers forming the liquid crystal display 10 is associated with a certain amount of loss in transmitted light. For example, approximately 67% of the visible energy from the backlight 1 is absorbed by just the color filters 19. It is therefore a problem in the industry to improve the efficiency of a liquid crystal display.

Another problem with many liquid crystal displays is that they offer a very limited viewing angle. In order to satisfactorily view an image on the liquid crystal display 10, the viewer must be positioned at an angle fairly close to directly in front of the display 10. It is thus a desire in the industry to produce images on a liquid crystal display which can be viewed from a wider viewing angle.

The cost of manufacturing a liquid crystal display is relatively high. One of the largest costs involved in manufacturing a liquid crystal display 10 is the color filter mosaic pattern 19. The color filter mosaic pattern 19 must be chromatically accurate if the display 10 is to produce accurate images. The color filter mosaic pattern 19 achieves this high degree of precision by employing very expensive organic dyes which must be uniformly deposited and light stable. In addition to the various layers shown in FIG. 1, many liquid crystal displays are also fabricated with retardation films or double domains to counteract the effects of birefringence. Also, active-matrix liquid crystal displays often have a significant number of defective transistors. The color filter mosaic pattern, the retardation films, double domains, and low yields from defective transistors cause the price of the liquid crystal display 10 to be relatively high.

Another problem associated with liquid crystal displays is flicker. A liquid crystal display with an active-matrix pattern includes an integrated storage capacitor per pixel for holding a necessary electric field throughout the frame time. The storage capacitors in active-matrix liquid crystal displays therefore hold the image on the display between successive images, thereby preventing flicker. The liquid crystal displays with a passive-matrix pattern, on the other hand, do not have any storage capacitor but instead rely upon the intrinsic capacitance of the liquid crystal material to reduce flicker between successive images. The passive-matrix liquid crystal displays therefore employ slow response liquid crystal materials which eliminate the flicker but, due to their slow response, prevent the displays from having full-motion video capabilities. The slow response liquid crystal materials also cause smear during the display of fast-motion images. It has therefore been a problem in the display industry to provide a passive-matrix liquid crystal display which has neither flicker nor smear and which provides full-motion video capability.

In order to improve the transmittance efficiency, liquid crystal displays have been designed with phosphor layers. For instance, U.S. Pat. No. 5,146,355 to Prince et al. has a phosphor layer for receiving ultraviolet light and for converting the ultraviolet light into visible light. Also, Kevin Walsh et al. proposed a liquid crystal display having phosphors in "Improved lighting efficiency for active-matrix liquid crystal displays" in SPIE Vol. 2219 Cockpit Displays, 1994. In general, with these liquid crystal displays, the phosphors are located within the liquid crystal cell itself and generate visible light, which is subsequently modulated by the liquid crystal cell.

While the structure in these displays may improve the transmittance efficiency, the liquid crystal displays are still prone to many of the above problems. For instance, the liquid crystal displays would still have problems with birefringence and associated limited viewing angles, flicker, and smear. The response of the liquid crystal displays is still limited by the characteristics of the liquid crystal material. Thus, the displays with a passive matrix would need to employ a slow response liquid crystal material in order to reduce flicker, but would still be prone to smear and be unable to display full-motion video.

Additionally, the liquid crystal displays would have a low contrast. The phosphor materials positioned within the liquid crystal cell have a lambertian emission characteristic whereby light is emitted within an angle of about 180 degrees. Because the light is highly divergent, light from a single phosphor will cross-over into other pixels, thereby reducing the contrast of the liquid crystal display. Thus, the benefit of a higher transmittance efficiency will be offset by the lower contrast.

A further difficulty with the liquid crystal displays in Prince et al. and Walsh et al. is that the displays will be fairly expensive to manufacture. Both of these displays will require a change in the typical method in which a liquid crystal cell is manufactured so that the phosphor layers, as well as planarizing layers to offset the irregularly shaped surfaces of the phosphor layers, can be included within the cell. In addition to the phosphor layers and planarizing layer, the cells will also require other layers, such as dichroic filters and polarizers, all of which substantially increase the cost of the liquid crystal cell. These additional layers also increase the distance that the light diverges before reaching the liquid crystal material and, consequently, increases cross-talk and lowers the contrast of the displays. To improve the contrast, the displays would still require the expensive color filters inside the cell, which further increases the cost of the displays. These additional layers within the liquid crystal cell will most likely require thin film manufacturing techniques which will also raise the cost of the displays and lower the manufacturing yields. Therefore, the liquid crystal displays in Walsh et al. and Prince et al. will be significantly more expensive to manufacture than a comparable conventional display.

A need therefore exists for a liquid crystal display which has a higher transmittance efficiency, which is free from birefringence, which does not exhibit flicker between successive images, which does not exhibit smear, and which has an optimal viewing angle. A need also exists for a liquid crystal display which has a higher contrast and which is more inexpensively manufactured.

SUMMARY OF THE INVENTION

It is an object of the present invention to improve the energy efficiency of a transmissive liquid crystal display.

It is also an object of the present invention to provide a liquid crystal display which has an optimal viewing angle.

It is another object of the present invention to improve the color gamut and contrast of a liquid crystal display.

It is a further object of the present invention to enable full-motion video without flicker or smear on a liquid crystal display using passive matrices.

It is yet another object of the present invention to improve manufacturing yields, and thereby reduce production costs, of both active-matrix and passive-matrix liquid crystal cells.

It is yet a further object of the present invention to provide a liquid crystal display which is free from birefringence.

Additional objects, advantages and novel features of the invention will be set forth in the description which follows, and will become apparent to those skilled in the art upon reading this description or practicing the invention. The objects and advantages of the invention may be realized and attained by the appended claims.

To achieve the foregoing and other objects, in accordance with the present invention, as embodied and broadly described herein, an emissive liquid crystal display device comprises a source of radiation and a diffuser, or any other suitable device, for dispersing the radiation. The radiation is then passed through a layer of liquid crystal molecules which control the passage of radiation through a plurality of pixel locations, thereby modulating the radiation. An emissive layer, which is preferably a phosphor layer, is positioned to receive the modulated radiation and to convert the modulated radiation into visible light. Since the layer of liquid crystal molecules is located between the phosphor layer and the source of radiation, the visible light is produced directly from the modulated radiation.

Preferably, the liquid crystal display also has a dichroic filter located between the liquid crystal cell and the phosphor material. The invention may also have a diffuser and a collimator to improve the spatial distribution and minimize the divergence of the diffused radiation as it propagates through the liquid crystal cell.

The liquid crystal display according to the invention provides numerous advantages over conventional displays. For instance, the liquid crystal display according to the invention provides a much greater transmittance efficiency, an optimal viewing angle, an increased contrast ratio, an improved chromacity, provides full-motion video capability, and eliminates birefringence and smear. The liquid crystal display according to the invention can be embodied using cells having varying methods of illumination, matrix types, addressing techniques, as well as operational modes.

These and other features of this invention will become apparent from a detailed review of this specification, taken in conjunction with the accompanying drawings and the written description.

BRIEF DESCRIPTION OF THE DRAWINGS

The accompanying drawings, which are incorporated in, and form a part of, the specification, illustrate a preferred embodiment of the present invention and, together with the description, serve to explain the principles of the invention.

In the drawings.

DETAILED DESCRIPTION OF THE PREFERRED EMBODIMENTS

Reference will now be made in detail to the preferred embodiments of the invention, examples of which are illustrated in the accompanying drawings.

Figure 2:
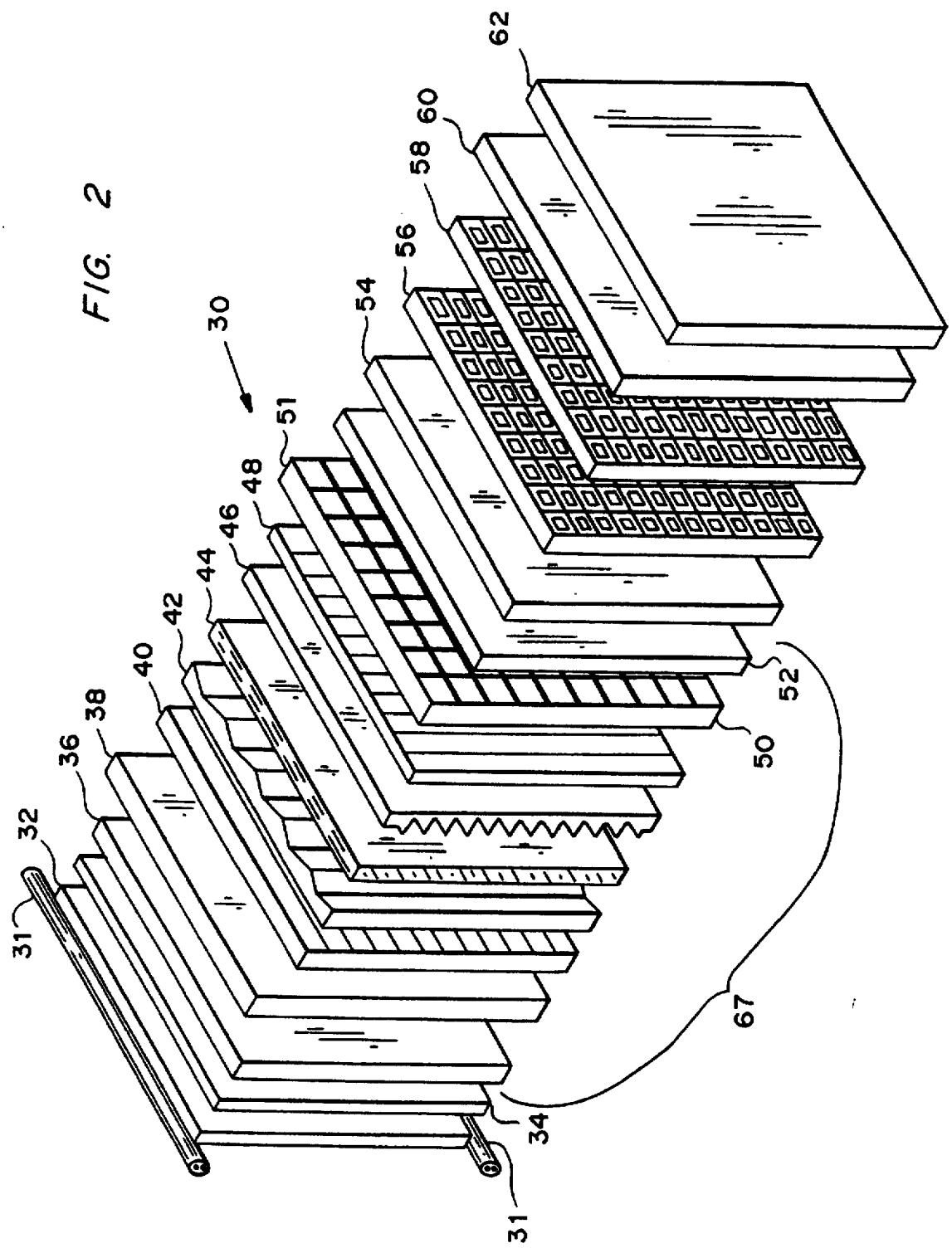
FIG. 2 is an perspective view of an emissive liquid crystal display using a passive-matrix cell according to a first embodiment of the invention.

With reference to FIG. 2, a liquid crystal display 30 according to a preferred embodiment of the invention comprises fluorescent tubes 31 that emit a narrow band spectrum of near-ultraviolet (UV) light centered between 350 nm to 365 nm. The light tubes 31 function as a backlight to illuminate images formed with the liquid crystal display 30. It should be understood that the invention is not limited to the use of the two tubes 31 which are located near the top and bottom of the display 30 but rather may be embodied with any suitable arrangement, number, or types of lights. For instance, the invention may have edge-lit or serpentine configurations of lights or may have cathodoluminescent, electroluminescent, incandescent or fiber optic sources of light.

The emitted near-UV light is sent through a light pipe and diffuser 32. While the light pipe and diffuser 32 have been illustrated as a single element, the light pipe and diffuser 32 may be formed as separate elements. After passing through the light pipe and diffuser 32, the near UV light is preferably collimated by a collimator 34. The collimator 34 need not be a separate element but may be integrated with the light pipe and diffuser 32.

The collimated near-UV light is polarized by a rear polarizer 36 which is adhered to a rear transparent substrate 38. An electrode pattern 40 forming row electrodes of a passive-matrix is deposited and patterned onto the rear transparent substrate 38. A first alignment layer 42 is deposited on the electrode pattern 40 and a liquid crystal layer 44, which is preferably a nematic liquid crystal layer, is positioned between the first alignment layer 42 and a second alignment layer 46. The liquid crystal layer 44 preferably has spacers which are light-absorbing or black so as to not disperse incident light. As depicted in FIG. 2, the alignment layers 42 and 46 have grooves formed in orthogonal directions to each other to ensure that the director in the liquid crystal material 44 twists between 90 degrees and 270 degrees. The second alignment layer 46 is deposited on top of an electrode pattern 48 which forms column electrodes for the passive-matrix. While not shown, the display 30 preferably comprises corresponding passivation layers for the electrode layers 40 and 48.

The electrode pattern 48 is deposited and patterned on a front transparent substrate 50 and a front polarizer 52 is adhered to the transparent substrate 50. A dichroic filter 54 is located between the front polarizer 52 and an emissive material, which is preferably a phosphor layer 56. In this example, the dichroic filter 54 comprises materials which are transmissive to narrow band near-UV light centered between 350 nm to 365 nm and reflective to light across the visible spectrum, from approximately 400 nm to 700 nm. The advantage of the dichroic filter 54 is that a substantial amount of the visible light emitted by the phosphor 56 in the rearward direction is redirected towards the viewer and approximately doubles the luminance of the emissive liquid crystal display 30. The dichroic filter 54 should thus result in an increase in luminance from the phosphor layer 56 for a constant amount of excitation energy provided by the fluorescent tubes 31. The manner in which the dichroic filter 54 is attached is not critical to the invention and may be deposited on either the front polarizer 52 or the phosphor layer 56. Also, the dichroic filter 54 may be fabricated in any suitable method, such as with conventional optical thin films technique.

The phosphor layer 56 preferably comprises red, green and blue phosphors, such as those designated by JEDEC number P22. The phosphors selected in the phosphor layer 56 should have high quantum efficiencies for a narrow band excitation spectrum centered between 350 nm to 365 nm. The following formulations have been found to have high quantum efficiencies for this preferred narrow band excitation spectrum centered between 350 nm to 365 nm: europium activated yttrium oxysulfide for red emissions, silver activated zinc sulfide for blue emissions and copper aluminum activated zinc sulfide for green emissions. The phosphors within layer 56 may be patterned and deposited in conventional ways, for example, with vertical stripes or in a delta configuration. A black matrix may also be deposited around the phosphor dots with the black matrix preferably being oversized to minimize cross-talk between adjacent pixels. A clear lacquer or acrylic may be deposited on top of the phosphor layer 56 to provide a planar surface. The use of a clear lacquer coating also eases the handling requirements of alignment and registration with the liquid crystal cell.

A color filter mosaic pattern 58 is matched to the pattern of the phosphor layer 56. In other words, the same geometry of colors is used for both the color filter mosaic pattern 58 and the phosphor layer 56 whereby each filter dot in the filter pattern 58 is aligned with a phosphor dot in the phosphor layer 56 which emits visible light corresponding to the transmissive color of the filter dot. The color filter mosaic pattern 58 improves the contrast of the liquid crystal display 30 by absorbing a substantial amount of ambient light.

Figure 1:
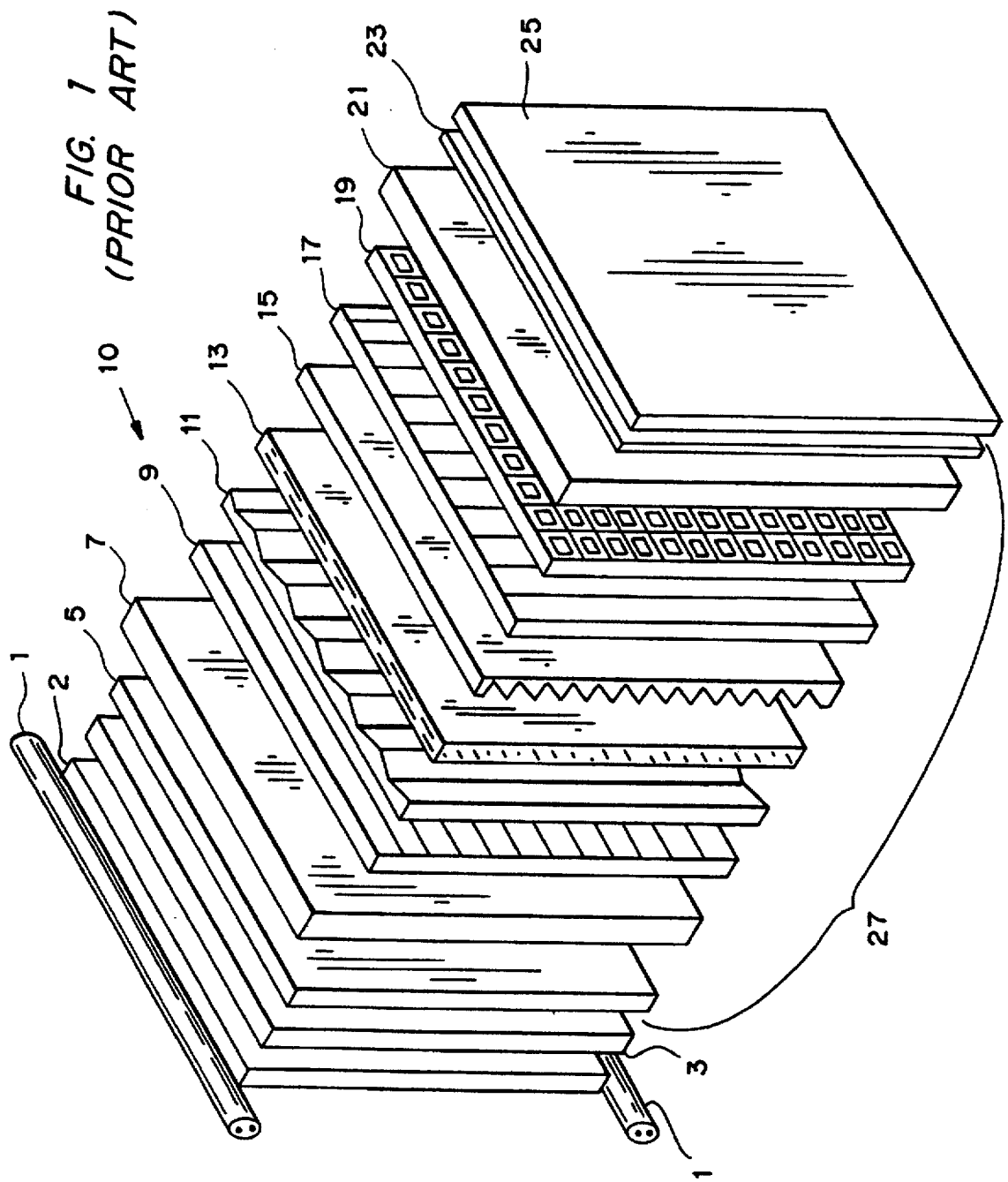
FIG. 1 is an exploded perspective view of the conventional liquid crystal display.

In contrast to the color filter mosaic pattern 19 in the display 10 of FIG. 1, the color filter mosaic pattern 58 need not be chromatically correct since the phosphors in the phosphor layer 56 are chromatically correct. Consequently, the color filter mosaic pattern 58 preferably uses less expensive materials, such as inorganic pigments, to significantly reduce the cost of the liquid crystal display 30. Also, since the color filter mosaic pattern 58 need not transmit the maximum amount of light, the black matrix of the pattern 58 can be oversized relative to the sizing of the black matrix in pattern 19 of FIG. 1 so as to further reduce cross-talk and increase contrast.

A black matrix may also be employed within the liquid crystal cell 67 and a transparent acrylic topcoat may be deposited to provide a planar surface on the color filter mosaic pattern 58. For example, a black matrix 51 is preferably deposited on the inside surface of the cell of transparent substrate 50 to further reduce cross-talk and to ease collimation requirements. The black matrix 51 is illustrated different than the black matrices on the phosphor layer 56 and color filter mosaic pattern 58 to highlight the fact that the black matrix 51 is not associated with any color filters. The black matrix 51 may be oversized relative to the black matrix in color filter mosaic pattern 19 in FIG. 1 and may be equal to, undersized, or even oversized relative to the black matrices on the phosphor layer 56 and color filter mosaic pattern 58.

The liquid crystal display 30 may have additional layers. For instance, a second dichroic filter, which is transmissive to visible light and reflective to near-ultraviolet radiation, may be positioned in front of the phosphor layer 56. Also, a UV-cutting material is preferably added to either the color filter elements in the color filter mosaic pattern 58, to the transparent acrylic topcoat or to transparent substrate 64 so that any of the excitation spectrum transmitted through phosphor layer 56 can be absorbed. The UV radiation should be absorbed so as to prevent the UV radiation from possibly harming the viewer. Also, by absorbing the excitation spectrum, a transparent substrate 60 does not become discolored, such as when the transparent substrate 60 is made from plastic. The transparent substrate 60 need not be made from plastic but may be made from any suitable material, such as any type of glass. The liquid crystal display 30 may also have anti-reflection treatments 62 which may comprise multi-layer optical thin film stacks found in conventional liquid crystal displays and may alternatively be diffusion treatments, such as chemical etchants or mechanical buffing, commonly used for CRT face plates.

In operation, the near-UV light from the tubes 31 is polarized and preferably collimated prior to reaching a liquid crystal cell 67 of the display 30. As shown in FIG. 2, the liquid crystal cell 67 includes those elements of the display 30 from the rear polarizer 36 to the front polarizer 52. Within the liquid crystal cell, the near-UV light is modulated according to the electric fields generated by the row electrodes 40 and the column electrodes 48. From the liquid crystal cell 67, the modulated near-UV light is converted into red, green, and blue visible light by the red, green, and blue phosphors in the phosphor layer 56, respectively. The visible light emitted by the phosphor layer 56 then passes through an optional color filter mosaic pattern 58 to improve color contrast, through the transparent substrate 60, and then through anti-reflection treatments 62. While not preferred, the phosphors within the phosphor layer 56 may be pigmented.

With the liquid crystal display 30, the phosphor layer 56 is positioned near the front of the liquid crystal display 30. Since the phosphors have a lambertian emission profile, the liquid crystal display 30 has a viewing angle of about 180 degrees, which is identical to the viewing angle of a CRT. Thus, the liquid crystal display 30 according to the invention provides an optimal viewing angle for liquid crystal displays.

Significantly, the liquid crystal cell 67 in the liquid crystal display 30 does not have the color filters of the mosaic pattern, such as the color filter mosaic pattern 19 in FIG. 1. The color filter mosaic pattern 19 in the display 10 of FIG. 1 greatly reduced the transmittance efficiency with about 67% of the light from the tubes 1 being absorbed by the color filter mosaic pattern 19. Since the invention eliminates the need for a color filter mosaic pattern 19 within the liquid crystal cell 67, the transmittance efficiency should therefore be substantially increased and the cost of a liquid crystal display significantly reduced. The polarizers 36 and 52 preferably do not contain any materials absorbing the near-UV light from the tubes 31 so as to further increase the transmittance efficiency of the display 30.

The liquid crystal display 30 according to the invention also reduces flicker. The phosphor layer 56 has a characteristic persistence which is advantageous for full-motion video applications of passive-matrix liquid crystal displays. As discussed above, displays having active-matrix patterns include an integrated storage capacitor per pixel which is lacking in the passive-matrix displays. The persistence of the phosphor layer 56 is much greater than the intrinsic capacitance of the liquid crystal material in passive-matrix displays and thus eliminates flicker between successive images.

The liquid crystal display 30 also reduces smear. Since flicker is eliminated through the use of the phosphor layer 56, a faster response liquid crystal material, which is typically used in active-matrix liquid crystal displays, may now replace the slow response liquid crystal material used in conventional passive-matrix liquid crystal displays. With the faster liquid crystal material, full-motion video may be displayed even in liquid crystal displays having passive-matrix patterns without exhibiting signs of smear.

Figure 3:
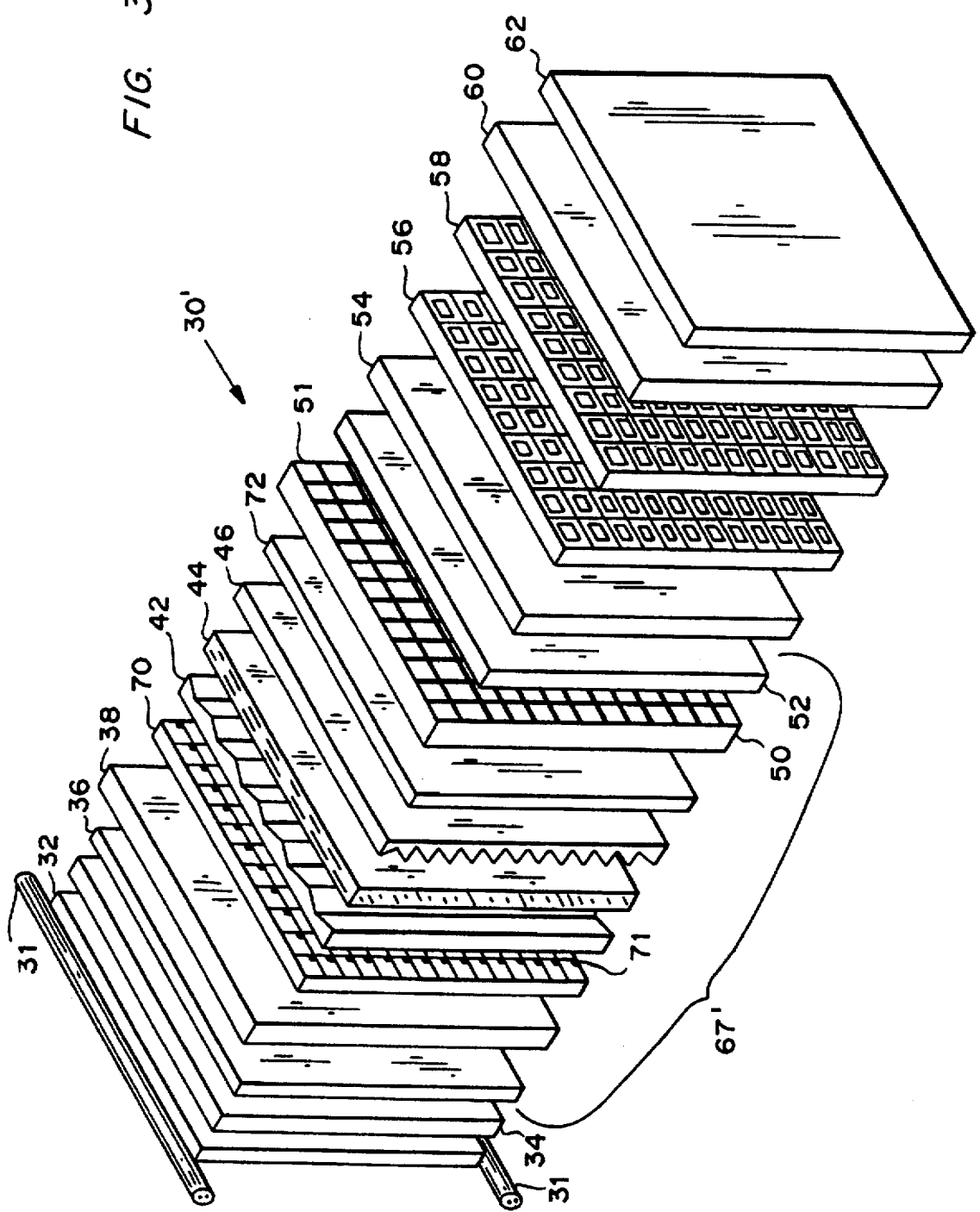
FIG. 3 is an exploded perspective view of an emissive liquid crystal display using an active-matrix cell according to a second embodiment of the invention.

With reference to FIG. 3, a liquid crystal display 30' according to a second embodiment of the invention differs from the liquid crystal display 30 in that display 30' is an active-matrix display while display 30 is a passive-matrix. Instead of the row and column electrode patterns 40 and 48 found in the display 30, the liquid crystal display 30' has an active-matrix 70 with an addressing element 71, such as a thin-film transistor, located at each pixel of the display 30 and has a ground plane 72. Thus, the liquid crystal cell 67' is an active-matrix liquid crystal cell. The phosphor layer 56 is preferably aligned and bonded to transparent substrate 50 which would normally contain a color filter mosaic. However, in the preferred embodiment, only the black matrix material is employed. The operation and advantages of the liquid crystal display 30' should be apparent from the description of the liquid crystal display 30 and, accordingly, will not be repeated.

With the liquid crystal displays 30 and 30' according to the invention, the cost of manufacturing a liquid crystal cell can be reduced. In addition to the color filter mosaic pattern 19, which has been eliminated with the invention, a significant factor in the cost for an active-matrix liquid crystal display is the low yields caused by defective transistors. While redundant transistor designs have been used in the prior art to overcome low yields, the redundant transistors decrease the energy efficiency of the display. The display 30' provides a dramatic increase in energy efficiency of active-matrix cells and thereby allows the use of redundant transistors to improve active-matrix manufacturing yields. The cost of passive-matrix displays may also be reduced since the retardation films commonly used to counteract the effects of birefringence may now be eliminated. The light emitted by the fluorescent tubes 31 is nearly monochromatic and preferably collimated, whereby the effects of birefringence are negligible. The cost of some liquid crystal displays are often increased due to the provision of multiple domains architectures to improve the viewing angles. Since the liquid crystal displays 30 and 30' according to the invention have an optimal viewing angle, the need for multiple domain architectures is eliminated and the cost for the displays is accordingly reduced.

The cost for the liquid crystal displays 30 and 30' is also minimized since the phosphor layer 56 is not incorporated into the liquid crystal cell 67 or 67'. With previous liquid crystal displays, such as those in Walsh et al. and Prince et al., the transmittance efficiency was increased by placing phosphors and additional layers within the liquid crystal cell. These additional layers, however, increased the cost and complexity of the cell. The invention, in contrast, can employ any suitable existing liquid crystal cell 67 or 67', does not require the insertion of additional layers within the liquid crystal cell 67 or 67'.

The liquid crystal displays 30 and 30' according to the invention also provide other improvements over conventional liquid crystal displays. For instance, the liquid crystals 30 and 30' provide an increased contrast ratio due to the persistence of the phosphor layer 56 and smaller losses in brightness. Also, the emissive liquid crystal displays 30 and 30' according to the invention employ JEDEC P22 phosphors, which are used in television CRT applications, whereby the chromacity in the displays 30 and 30' should be correct for television applications without requiring the high cost color filter mosaic pattern 19.

In a third embodiment of the invention, the fluorescent tubes 31 in either display 30 or display 30' emit a narrow band spectrum of monochromatic blue light centered between 420 nm and 450 nm. The phosphor layer 56 requires red and green phosphors but does not require blue phosphors and the dichroic filter 54 is transmissive to the narrow band monochromatic blue light centered between 420 nm and 450 nm and reflective to the remainder of the visible spectrum, for example, from 500 nm to 700 nm. Thus, the blue visible light is produced by the fluorescent tubes while the red and green visible light is produced by the phosphor layer 56. While the space for the blue phosphor does not require a blue phosphor, a blue phosphor, such as one that receives the radiation from the tubes 31 and emits light at a slightly different wavelength, may nonetheless be used. Alternatively, the displays 30 or 30' may have a dye, such as a blue fluorescent organic pigment, or may simply have a diffusive element.

As set forth above, the radiation emitted by the tubes 31 in the various embodiments is preferably centered between 350 nm to 365 nm or between 420 nm to 450 nm. If the radiation were at shorter wavelengths, the liquid crystal cell 67 or 67' itself could become damaged over time from the high intensity radiation. From the viewpoint of just preserving the integrity of the liquid crystal cell, the radiation centered between 420 nm to 450 nm would be advantageous over the radiation centered between 350 nm to 365 nm since the visible light portion of the spectrum would cause less potential damage to the liquid crystal cell 67. However, from the viewpoint of just efficiency, the radiation centered between 350 nm to 365 nm is advantageous since JEDEC P22 TV phosphors in the phosphor layer 56 are most efficient at these wavelengths. As a result, the phosphor layer 56 produces the maximum amount of light possible from the radiation incident from the liquid crystal cell 67 or 67'.

While not necessary, the liquid crystal displays 30 and 30' preferably include the collimator 34. To illustrate the benefits of the collimator 34, diagrams of the path that light travels in the liquid crystal display 30 with and without the collimator will be shown in FIGS. 4 and 5, respectively. While this comparison is being made with the liquid crystal display 30, it should be understood that the same comparison may be made with liquid crystal display 30'.

Figure 4:
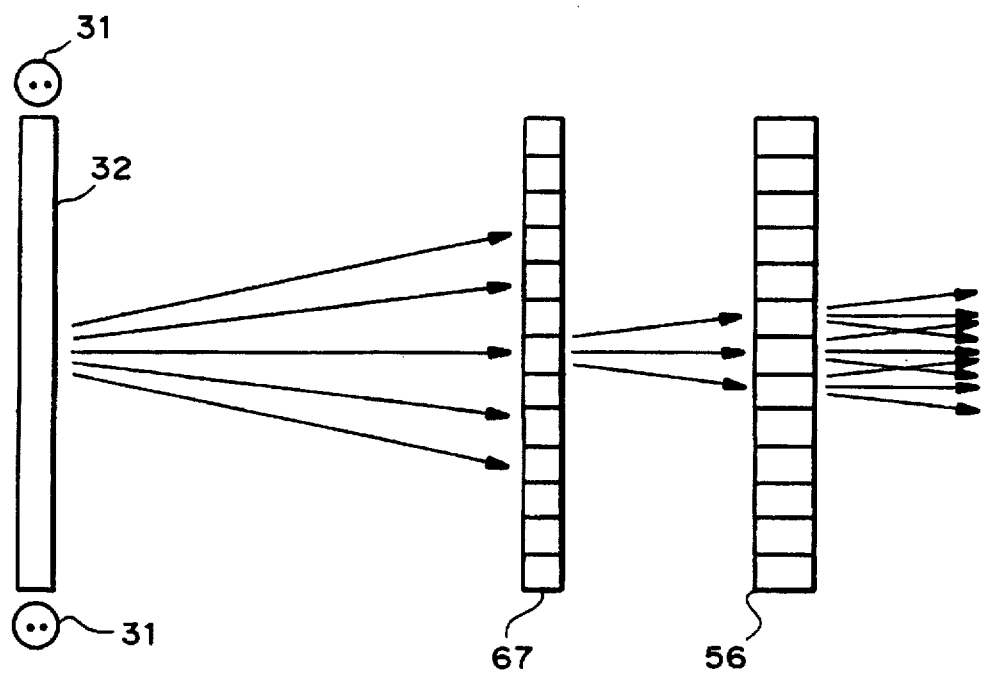
FIG. 4 is a schematic partial side view of light paths in a liquid crystal display according to the invention.

With reference to FIG. 4, the near-UV light from the light pipe and diffuser 32 propagates toward the liquid crystal cell 67. The light exiting a pixel from the liquid crystal cell 67 diverges rather rapidly and, as a result, excites adjacent pixels in the phosphor layer 56. The diagram in FIG. 4 has been exaggerated to illustrate the amount of cross-talk which may be present in the liquid crystal display 30 not having the collimator 34.

Figure 5:
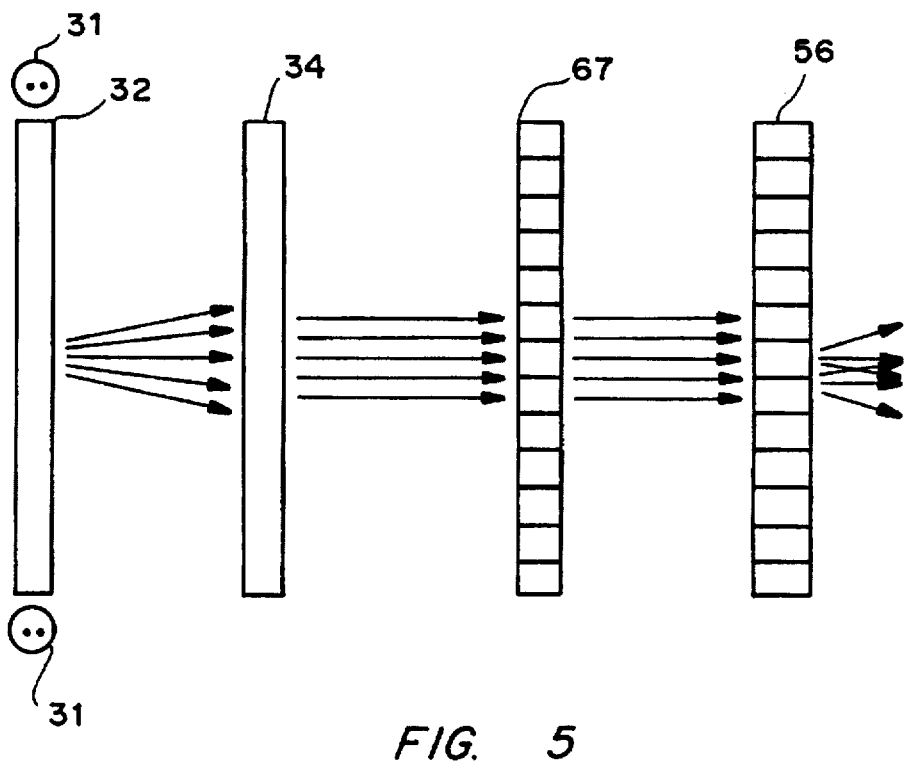
FIG. 5 is a schematic partial side view of light paths in a liquid crystal display according to the invention having a collimator.

With reference to FIG. 5, in contrast, the light leaving the light pipe and diffuser 32 propagates towards the collimator 34. The resultant collimated light exiting the collimator 34 propagates towards the liquid crystal cell 67 but does not diverge as rapidly as the light exiting the light pipe and diffuser 32 in FIG. 4. Because the collimated light leaving the liquid crystal cell 67 is not as divergent, the light only excites single pixels of the phosphor layer 56. By collimating the light with collimator 34, the amount of cross-talk can be significantly reduced. The amount of cross-talk can also be minimized, in general, by reducing the thickness of each element comprising liquid crystal cell 67, particularly the front substrate 50 and polarizer 52, and by introducing the black matrix 51 within the liquid crystal cell 67 and preferably on the transparent substrate 50.

The foregoing description of the preferred embodiments of the invention has been presented for purposes of illustration and description. It is not intended to be exhaustive or to limit the invention to the precise forms disclosed. Many modifications and variations are possible in light of the above teaching.

For example, the invention can be applied to a liquid crystal cell using any mode of operation. Thus, the invention can be applied, for instance, to displays having cholesteric, nematic, smectic, or other types of liquid crystal materials. Moreover, the invention may be applied, for instance, to polymer dispersed liquid crystal cells, plasma addressed liquid crystal cells, or ferroelectric liquid crystal cells. These modes of operation are based on different physical interactions between light and liquid crystals. Each is utilized to provide the ability to modulate the light passing through the cell in unique ways. As a result, some changes to the conventional structure of these liquid crystal cells, which will be apparent to those skilled in the art, may be necessary. For example, with the guest-host mode of operation, the invention would employ guest dyes that preferably absorb near-UV light along one or more axes for the first embodiment or guest dyes that absorb blue light for the second embodiment of the invention. Also, the invention may be applied to liquid crystal displays using modes of operation that do not need polarizers, such as polymer dispersed liquid crystal cells. Additionally, the invention does not restrict the addressing method and, consequently, either row sequential scanning or multiple line scanning may be used.

The invention is not limited to color liquid crystal displays but may also be applied to monochromatic displays. With a monochromatic display, the color filter mosaic pattern 58 and the phosphor layer 56 need not be patterned and, instead, a single phosphor would be used in the phosphor layer 56 and a single color filter would be used rather than the color filter mosaic pattern 58. Alternatively, the phosphor layer 56 and color filter mosaic pattern 58 may be replaced with a single pigmented phosphor.

The embodiments were chosen and described in order to best explain the principles of the invention and their practical application to thereby enable others skilled in the art to best utilize the invention and various embodiments and with various modifications as are suited to the particular use contemplated. It is intended that the scope of the invention only be limited by the claims appended hereto.

What is claimed is:

1. An emissive liquid crystal display, comprising:
a source of radiation;
means for dispersing said radiation;
means for modulating said radiation at a plurality of pixel locations, said modulating means including a layer of liquid crystal material to control a passage of said radiation through said pixel locations;
a layer of emissive material positioned to receive modulated radiation from said modulating means and for converting said modulated radiation into visible light, said layer of emissive material producing at least red and green visible light;
wherein said modulating means is located between said layer of emissive material and said source of radiation whereby said layer of emissive material produces said modulated visible light directly from said modulated radiation, said layer of emissive material comprises a phosphor layer, and said phosphor layer comprises only red and green phosphors for producing red and green visible light, respectively.

2. The emissive liquid crystal display as set forth in claim 1, wherein said source of radiation emits light centered between 420 nm and 450 nm.

3. The emissive liquid crystal display as set forth in claim 1, wherein said dispersing means comprises a diffuser.

4. The emissive liquid crystal display as set forth in claim 1, further comprising means for collimating said radiation for reducing cross-talk between said pixel locations.

5. The emissive liquid crystal display as set forth in claim 1, further comprising a light pipe positioned between said source of radiation and said modulating means for directing said radiation across said pixel locations.

6. The emissive liquid crystal display as set forth in claim 1, wherein said modulating means comprises an active-matrix liquid crystal cell.

7. The emissive liquid crystal display as set forth in claim 1, wherein said modulating means comprises a passive-matrix liquid crystal cell.

8. The emissive liquid crystal display as set forth in claim 1, further comprising a dichroic filter positioned between said modulating means and said layer of emissive material, said dichroic filter being transmissive to said radiation and being reflective to visible light emitted from said layer of emissive material.

9. The emissive liquid crystal display as set forth in claim 1, wherein said modulating means comprises a liquid crystal cell.

10. The emissive liquid crystal display as set forth in claim 9 wherein said liquid crystal cell includes a first black matrix disposed between said layer of liquid crystal material and said layer of emissive material and said layer of emissive material includes a second black matrix.

11. The emissive liquid crystal display as set forth in claim 10, wherein said second black matrix is oversized relative to said first black matrix.

12. The emissive liquid crystal display as set forth in claim 10, wherein said first black matrix is equal in size to said second black matrix.

13. The emissive liquid crystal display as set forth in claim 1, further comprising a dichroic filter positioned on an opposite side of said layer of emissive material as said modulating means, said dichroic filter being transmissive to visible light and reflective to said radiation.

14. The emissive liquid crystal display as set forth in claim 1, wherein said source of radiation emits blue light.

15. The emissive liquid crystal display as set forth in claim 14, further comprising a diffusive element positioned to diffuse the modulated radiation from said modulating means, said diffusive element diffusing the blue light.

16. The emissive liquid crystal display as set forth in claim 1, further comprising diffusive elements positioned within spaces in the layer of emissive material for diffusing the modulated radiation from the modulating means.

17. An emissive liquid crystal display, comprising:
a source of radiation;
means for dispersing said radiation;
means for modulating said radiation at a plurality of pixel locations, said modulating means including a layer of liquid crystal material to control a passage of said radiation through said pixel locations;
a layer of emissive material positioned to receive modulated radiation from said modulating means and for converting said modulated radiation into visible light, said layer of emissive material producing at least red and green visible light;

wherein said modulating means is located between said layer of emissive material and said source of radiation whereby said layer of emissive material produces said modulated visible light directly from said modulated radiation, said modulating means comprises a liquid crystal cell, said liquid crystal cell includes a first black matrix disposed between said layer of liquid crystal material and said layer of emissive material and said layer of emissive material includes a second black matrix, and wherein said first black matrix is oversized relative to said second black matrix.

18. The emissive liquid crystal display as set forth in claim 17, wherein said source of radiation emits light centered between 350 mm and 365 nm.

19. The emissive liquid crystal display as set forth in claim 17, wherein said layer of emissive material comprises a phosphor layer.

20. The emissive liquid crystal display as set forth in claim 19, wherein said phosphor layer comprises only red and green phosphors for producing red and green visible light, respectively.

21. The emissive liquid crystal display as set forth in claim 19, wherein said phosphor layer further comprises red, green, and blue phosphors for producing red, green, and blue visible light, respectively.

22. The emissive liquid crystal display as set forth in claim 19, further comprising a color mosaic filter having red filters aligned with red phosphors of said phosphor layer and green filters aligned with green phosphors of said phosphor layer.

23. The emissive liquid crystal display as set forth in claim 19, further comprising a color mosaic filter having red filters aligned with red phosphors of said phosphor layer, green filters aligned with green phosphors of said phosphor layer, and blue filters aligned with blue phosphors of said phosphor layer.

* * * * *